United States Patent [19]

Salensky

[11] 4,065,590

[45] Dec. 27, 1977

[54] ETHYLENE COPOLYMER GLASS BOTTLE COATING

[75] Inventor: George Anthony Salensky, Metuchen, N.J.

[73] Assignee: Union Carbide Corporation, New York, N.Y.

[22] Filed: Oct. 13, 1976

[21] Appl. No.: 732,128

[51] Int. Cl.$^2$ .......................... B05D 1/24; B05D 3/02
[52] U.S. Cl. ..... 428/35; 215/1 R; 427/185; 427/195; 427/375; 428/429; 428/441; 428/523
[58] Field of Search ...... 215/1 R; 427/185, 195, 375; 428/35, 429, 441, 523; 526/16, 26

[56] References Cited

U.S. PATENT DOCUMENTS

| | | | |
|---|---|---|---|
| 3,239,370 | 3/1966 | Thomson et al. | 428/483 |
| 3,386,855 | 6/1968 | Scholes | 428/441 |
| 3,415,673 | 12/1968 | Clock | 427/185 X |
| 3,507,680 | 4/1970 | Kiel | 428/441 X |
| 3,520,861 | 7/1970 | Thomson et al. | 428/500 |
| 3,661,628 | 5/1972 | Marsden | 428/429 |
| 3,753,965 | 8/1973 | Looney et al. | 526/16 X |
| 3,836,386 | 9/1974 | Roy | 428/35 X |
| 3,864,151 | 2/1975 | Shonebarger et al. | 427/402 X |
| 3,909,487 | 9/1975 | Waggoner | 427/195 X |
| 3,922,450 | 11/1975 | Stengle | 428/35 |
| 3,959,539 | 5/1976 | Waggoner | 428/35 |
| 3,984,608 | 10/1976 | Opitz | 428/35 X |

*Primary Examiner*—Harry J. Gwinnell
*Assistant Examiner*—Shrive P. Beck
*Attorney, Agent, or Firm*—Bernard Francis Crowe

[57] ABSTRACT

Single trip bottle coatings have been formulated from ethylene/acrylic or methacrylic acid copolymers as well as inorganic salts of these copolymers together with minor amounts of anti-caking agents, lubricity additives, and optionally adhesion modifiers.

12 Claims, No Drawings

ETHYLENE COPOLYMER GLASS BOTTLE COATING

BACKGROUND OF THE INVENTION

This invention pertains to single trip bottle coatings formulated from ethylene-acrylic acid copolymers, ethylene/methacrylic acid copolymers or inorganic salts thereof and in particular to formulations based on these copolymers containing minor amounts of anti-caking agents, lubricity additives and optionally adhesion modifiers.

Carbonated beverages packed in glass bottles are potentially hazardous because of the internal gas pressure. This internal gas pressure can explode defective bottles producing flying glass fragments which may injure persons in the immediate vicinity. The larger carbonated beverage bottles, that is, those containing over 16 ounces are more prone to accidental explosion than smaller bottles.

Carbonated beverage bottles have been coated with various plastic materials in an attempt to ameliorate this potentially dangerous condition. For example, a jacket of polystyrene foam has been used for protection of such bottles from impact thereby lessening breakage. However, the polystyrene jacket does not retain glass fragments upon breakage and therefore does not qualify as a shatter resistant bottle, the goal sought by the bottling industry. An ethylene/vinyl acetate copolymer has been used on light-weight non-returnable carbonate beverage bottles to improve shatter resistance but such coating are opaque and will often require a thickness of about fifteen mils for glass containment.

In general the following requirements exist for commercially acceptable polymer coatings for carbonated beverage bottles:

1. Fragment retention of beverage bottles containing 60 p.s.i.g. carbon dioxide internal pressure.
2. Appearance must be clear and have a smooth texture.
3. The polymer coated bottle surface must provide good lubricity and label adhesion.
4. The polymer coating must be abrasion resistant and retain a good appearance under all use conditions.
5. The polymer coating must be compatible with the environment.

Of the above requirements fragment retention is by far the most important and critical. One procedure used by bottle manufacturers comprises charging polymer coated bottles with carbon dioxide, i.e., 60 p.s.i.g. and dropping them from a height of 4 feet in a horizontal position onto a steel plate imbedded in concrete. The drop results in side wall failure generally in the impact area. A scatter index is calculated for 24 bottles by multiplying the percent glass found in concentric zones measured in feet from the point of impact. The percent retention is calculated as the percent glass retained within the distance of a 3 foot diameter circle from the point of impact. The desired figure is greater than 80 percent.

Another test comprises dropping the pressurized bottles in a vertical position and measures the number of tears inflicted on a four mil polyethylene film surrounding the dropped zone at a distance of 12 inches therefrom by flying glass particles.

Appearance is important to permit the consumer to inspect the contents of the coated bottle and to permit decorative printing directly on the bottle thus eliminating separate labeling operations at a bottling plant.

SUMMARY OF THE INVENTION

It has now been found that a composition meeting the above listed criteria for coating carbonated one trip beverage bottles is provided by a composition consisting essentially of:

(A) About 80 to about 99 percent by weight, based on the total composition weight, of an ethylene copolymer selected from the group consisting of normally solid ethylene/acrylic acid copolymers, ethylene/methacrylic acid copolymers, and copolymers having 10 percent to 90 percent by weight of the carboxylic acid groups of said ethylene/acrylic acid or ethylene/methacrylic acid copolymers ionized by neutralization with metal ions having an ionized valence of one to three inclusive wherein said random ethylene copolymers contain from about 8 to about 25 percent by weight of acrylic acid or methacrylic acid copolymerized therein;

(B) About 0.5 to about 3 percent by weight, based on the total composition weight, of an anti-caking agent selected from the class consisting of saturated fatty acid amides, having about 10 to 22 carbon atoms, monohydroxy substituted saturated fatty acid amides having about 10 to about 22 carbon atoms, or alkylene bis-saturated fatty acid amides having the general formula

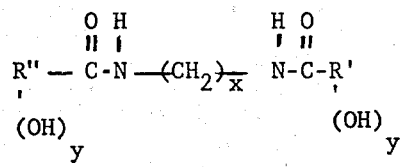

wherein x is an interger having values of 0 to about 12, wherein R' and R'' are each aliphatic hydrocarbon residues having about 10 to about 22 carbon atoms; and wherein y is an integer having values of 0 to 2 inclusive;

(C) About 0.1 to about 1 percent by weight, based on the total composition weight, of a silicone fluid lubricity additive having the formula

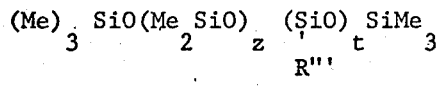

where: Me is methyl; z is an integer having an average value of about 6 to about 40; t is an integer having an average value of about 3 to about 40; and R''' is a monovalent group selected from the class consisting of —$C_2H_4$-phenyl and alkyls having about 18 to 22 carbon atoms.

(D) 0 to about 16 weight percent, based on the total composition weight, of an adhesion modifier selected from the class consisting of polyethylene glycols having a molecular weight of about 190 to about 6000, monomethyl ethers of polyethylene glycols having a molecular weight of about 550 to about 5000, and magnesium oxide having a particle size of less than about 0.1 micron and a surface area of greater than about 50 square meters per gram.

Suitable ethylene/acrylic acid or methacrylic acid copolymers are known in the art and can be made by the direct copolymerization of ethylene with acrylic acid or methacrylic acid respectively under conditions which provide random copolymerization of the respective moieties. Random ethylene/acrylic acid and ethylene/methacrylic acid copolymers suitable for use of this invention are described in various patents including U.K. Pat. No. 963,380, and U.S. Pat. No. 3,520,861. The preparation of salts of these random ethylene copolymers are described in U.S. Pat. No. 3,264,272.

Preferred ethylene-acrylic acid and ethylene-methacrylic acid copolymers contain from 15 to about 20 percent acrylic acid copolymerized therein and have molecular weights as indicated by their respective melt indexes of about 5 to about 350 decigrams per minute when measured in accordance with ASTM D—1238.

The preferred salts of ethylene/acrylic acid or methacrylic acid copolymers are those obtained by neutralization of the carboxylic acid moiety with alkali metal hydroxides or alkaline earth hydroxides. Particularly preferred are the sodium salts of ethylene/acrylic acid and ethylene/methacrylic acid copolymers. A preferred alkaline earth copolymer salt is the zinc salt of ethylene/acrylic acid copolymer.

The preferred anti-caking agents include: ethylene bis-stearamide, methylene bis-stearamide, behenamide and ethylene bis(hydroxy stearamide).

In contrast the following anti-caking agents were found to be ineffective at concentrations of 1–10% based on the weight of the total bottle coating composition:

Calcium stearate, magnesium stearate, Carbowax 4000, pentaerythritol tetrastearate, cetyl stearate, trimethylolethane, hydrated alumina, bentonite, sodium bicarbonate, ammonium carbonate, sodium stearate, N,N'-di-n-hexyl terephthalamide, N,N'-di-n-octyl terephthalamide, stearyl amine, polyethylene wax, dimethyl terephthalate, polymekon wax (proprietary polymerized microcrystalline wax), mekon wax.

Preferred lubricity additives include silicone fluids having the formula:

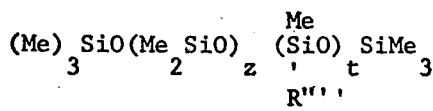

where R'''' is phenylethyl, when z is 6 and t is 3 or alkyl having 8 to 22 carbon atoms when z and t are each 40.

The criticality of the use of silicone fluid lubricity additives is demonstrated by the fact that the following materials used in many end use applications for their lubricating properties were ineffective in the bottle coating compositions of this invention when employed as 1% solutions in water or isopropyl alcohol (IPA): Carnauba wax aqueous dispersion, oleamide/IPA, erucamide/IPA, sodium oleate/water, stearamide/IPA, glycerol monostearate/IPA, stearylamine acetate/water, oleyl amine/IPA, and oleic acid/IPA. Straight silicone oils do not satisfy the lubricity requirements of these bottle coatings because they interfere with labeling of the coated bottles.

When adhesion modifiers are to be used, it is preferred to use: polyethylene glycols having a molecular weight of from 4000 to about 18000 and magnesium oxide.

An unexpected attribute of the composition of this invention lies in the fact that anti-caking agents such as ethylene bis-stearamide act synergistically with silicone fluid lubricity aids exemplified by the data in Table 1 where the coefficients of friction of coated bottles was compared with uncoated bottles in the three bottle pyramid test. This is a typical test for lubricity which measures the angle at which the top of a pyramid of three bottles slides off the other two. This test is widely used in the beverage industry. As a rule of thumb the maximum coefficient of friction acceptable by the bottle industry is about 0.35 using the pyramid test. This test is described in detail in U.S. Pat. No. 3,864,151 which is incorporated herein by reference.

Good lubricity is required for polymer coated bottles by the industry in order that they may be conveyed in standard handling equipment. In a glass filling line, the bottles rub together against another and move at rapid speeds during the filling operation. The bottle manufacturer cannot tolerate more friction with a plastic coated bottle than he is accustomed to with an uncoated glass bottle.

TABLE 1

BOTTLE SLIP PROPERTIES OF COATINGS

| Coefficient of friction | Ethylene copolymer | Anticaking agent | Silicone Fluid Lubricity aid |
|---|---|---|---|
| 0.35 [A] | None | None | None |
| 0.10 | Ethylene/acrylic acid copolymer [1] | EBSA [2] 1 wt. % | Phenylethyl-methylsilicone [3] |
| 0.55 | " | None | " |
| 1.1 | " | EBSA [2] 2 wt. % | None |
| 1.3 | " | EBSA [2] 1 wt. % | " |
| 1.5 | " | EBSA [2] 0.5 wt. % | " |
| 10.0 | " | None | " |

[A] Uncoated glass bottle.
[1] Melt index of 85–90 dg./min. of an ethylene copolymer containing 18–20 wt. % acrylic acid copolymerized therein.
[2] Ethylene bis-stearamide.
[3]
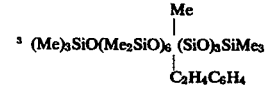

While ethylene/acrylic acid copolymers have been known previously to coat glass surfaces, these copolymers alone are unsatisfactory for use as bottle coatings due to both the nature of the polymer coating and its undesirable properties when exposed to bottle handling conditions, and also to the problems involved in handling it as a powder both in storage and in the actual application to glass bottles. In order to be accepted for use on a commercial scale, it is de regeur that the ethylene propolymers described above be modified with at least one of the anti-caking agents and lubricity additives enumerated above. For optimum results it is also recommended that one of the adhesion modifiers recited above be also included in the bottle coating formulation in order to improve glass retention properties. One of the more difficult formulating problems has been the tendency of ethylene/acrylic acid copolymer powders to cake on storage. Inorganic additives such as various silicas and treated silicas which have been generally applied to the solution of such problems are only partly effective and are undesirable in bottle coating formulations because they result in coating film flow-out problems. The most preferred anti-caking agents are ethylene bis-stearamide, and the like. The efficacy of the anti-caking agents in this system is measured by blending 0.5 percent of the anti-caking agent into ethylene copolymer powder and storing the resultant mixture at 25° C. in a large test tube for two weeks under a pressure of 85 pounds per square foot which is equivalent to a 50 inch head of powder. The test tube holding the powder blend is then shaken by hand to determine if the powder is free flowing.

Handling of ethylene copolymer pellets prior to formulation into a bottle coating powder also presents problems since they have a tendency to cake in storage with the result that mechanical loaders such as screw conveyors cannot be used without stalling due to lumping of the pellets.

This problem is demonstrated by a comparison of ethylene/acrylic acid copolymer pellets approximately ¼ inch in diameter containing about 21% acrylic acid copolymerized therein and having a melt index of about 90 decigrams per minute stored at 40° C. under 85 pounds per square foot pressure. These pellets untreated by any anti-caking additive blocked in less than one day under the above described conditions. If 0.1% by weight of ethylene bis-stearamide were added to the pellets, blocking was inhibited for more than thirteen (13) days.

The degree of adhesion of the coating to the glass bottles is anomalous in that while some adhesion is desired an excess of adhesive strength is undesirable because strongly bonded polymer composites when coated on glass shatter on impact because of the high stress at the glass breakpoint. Intermediate adhesion which is the desired end result causes partial delamination at the glass breakpoint and a distribution of the stress throughout the polymer film. This intermediate adhesion expressed in terms of peel strengths of ethylene copolymer to glass bottles is desirably in the range of about 2-5 pounds per lineal inch. Unmodified ethylene/acrylic acid copolymer has a peel strength of >10 pounds per lineal inch. In the standard drop test when test bottles are pressurized to 60 p.s.i.g., those coated with unmodified ethylene/acrylic acid copolymer showed only 88% retention of the broken glass particles. In contrast bottles coated with the compositions of this invention exhibited 97-99.5% retention of the broken glass particles.

It will be appreciated by those skilled in the art that the compositions of this invention may also include minor amounts of additives such as antioxidants heat stabilizers, UV stabilizers, humectants, colorants and the like.

The invention is further described in the examples which follow. All parts and percentages are by weight unless otherwise specified.

EXAMPLE 1

100 grams of an ethylene/acrylic acid copolymer having a melt index of 65-100 decigrams per minute (as measured by ASTM D-1238 Condition E) and containing about 21 percent by weight of acrylic acid polymerized therein in the form of a 120 mesh powder classified with a No. 120 U.S. Series sieve (described on page 911, of the Handbook of Chemistry edited by N. A. L. Lange, 10th Edition, McGraw-Hill Book Company in New York City, 1961) was charged to a one gallon Henschel mixer with one gram of ethylene bis-stearamide. These two components were mixed at 2,000 r.p.m. for 2 minutes. Then 0.25 gram of magnesium oxide was added and mixing continued for an additional minute after which the contents of the mixer were discharged.

The above described ethylene copolymer coating composition may be applied to glass bottles by methods known in the polymer coating art, as for example, by spray, electrostatic powder spray, flame spraying of solid particles or dipping or spraying solutions or dispersions of the coating composition. A temperature range preferred for coating bottles with the coatng compositions of this invention is about 200-300° C. with 230-260° C. being particularly preferred. It has been found convenient to provide these coating temperatures by merely heating the bottles before the coating step with conventional heating means such as an oven. This obviates the necessity of having the coating system encumbered with a heating device. The coating time for applying the coating compositions is not narrowly critical. Times of about 2-15 minutes are preferred. The silicone fluid lubricity aid can be incorporated in the composition above or sprayed on over the first coating. In this case a 1% aqueous emulsion was sprayed on the first coating. The phenylethylmethyl silicone described in Table 1 was used. Forty-eight (48) ounce bottles containing a 5 mil thickness coating of the above composition showed glass retention when exposed to the bottle drop test of 97%.

Effective protection of glass bottles coated with the ethylene copolymer compositions described hereinabove is obtained with as little as about 3 mils average thickness although it is preferred to deposit a coating of about 5 mils to about 6 mils.

EXAMPLE 2

Extruder mixing was used with 100 parts by weight of the ethylene/acrylic acid copolymer described in Example 1, 0.1 part, by weight of Irganox 1010 (Tradename of Ciba-Geigy for tetrakis[methylene 3-(3',5'-di-t-butyl-4'-hydroxyphenyl)propionate]methane), 1 part by weight of ethylene bis-stearamide, 2 parts by weight of Carbowax 4000 (tradename of Union Carbide Corp. for polyethylene glycol having a molecular weight of 3000-3700) powder and 0.25 parts by weight of the silicone fluid used in Example 1.

Bottles, powder coated with the composition described in Example 2, showed not only a high protection against breakage when exposed to the bottle drop test but showed a film peel strength of about 2 to 5 pounds per inch of peel.

EXAMPLE 3

When Example 2 is repeated with the exception that an ethylene/methacrylic acid copolymer having 50 percent of its carboxyl groups neutralized with sodium ion is substituted for the ethylene/acrylic acid copolymer, the coating composition thus obtained protects bottles when applied as a continuous coating in the bottle drop test in a comparable manner.

EXAMPLE 4

A melt mix technique was used to prepare a powder coating composition for bottles by charging to a Henschel Mill the folowing materials: 100 parts by weight of the ethylene/acrylic acid copolymer as in Example 1, 1 part by weight of ethylene bis-stearamide, 0.1 part by weight of Irganox 1010 anti-oxidant, 2 parts by weight of Carbowax 4000, and 0.15 part by weight of the silicone fluid used in Example 1. A one inch screw with a smooth mixing section centrally located in the vacuum vented extrusion section was used. The mixing temperature was about 110 to 130° C. The extrudate was passed through a water bath into a strand cutter. The chopped strands were then cryogenically ground using liquid nitrogen. A minus 120 mesh product, i.e., material that passes through a 120 mesh sieve, was satisfactory for coatings of 5 mils or above. For coatings less than 5 mils minus 140 mesh product was collected.

EXAMPLE 5-8

Example 4 was repeated with some variations. The Carbowax 4000 was replaced by Carbowax 200 (Trademark of Union Carbide Corp. for a polyethylene glycol having a molecular of about 190-210) in three Examples and 0.6 part of lithium chloride per hundred parts by weight ethylene/acrylic acid copolymer was added as a humectant. The effect of variations in mean thickness on percent glass retention was also observed. Pertinent data are presented in Table 2.

TABLE 2

|  | Example | | | |
|---|---|---|---|---|
|  | 5 | 6 | 7 | 8 |
| Ethylene/acrylic acid copolymer | 100 | 100 | 100 | 100 |
| Ethylene bis-stearamide [1] | 1 | 1 | 1 | 1 |
| Irganox 1010 [1] | 0.1 | 0.1 | 0.1 | 0.1 |
| Carbowax 4000 [1] | 6 | — | — | — |
| Carbowax 200 [1] | — | 6 | 12 | 6 |
| Phenylethylmethyl silicone [1] [2] | 0.25 | 0.25 | 0.25 | 0.25 |
| Lithium chloride [1] | — | — | — | 0.6 |
| Number of 48 fluid ounce bottles coated | 12 | 12 | 12 | 12 |
| Mean coating thickness [3] | 3.8 | 4.1 | 3.5 | 4.0 |
| Percent glass retention in 3 foot circle | 99.6 | 99.7 | 99.1 | 99.1 |

[1] Parts by weight.
[2] Silicone described in Table 1.
[3] Mils.

Although the invention has been described in its preferred forms with a certain degree of particularity, it is understood that the present disclosure of the preferred forms has been made only by way of example and that numerous changes may be resorted to without departing from the spirit and scope of the invention.

What is claimed is:

1. An article of manufacture comprising a glass bottle having its outer surface coated with a clear continuous layer of a blend of:
    A. about 80 to about 99 percent by weight, based on the total weight of the blend, of a random, normally solid ethylene copolymer selected from the group consisting of normally solid ethylene/acrylic acid copolymers, ethylene/methacrylic acid copolymers and copolymers having 10% to 90% weight of the carboxylic acid groups of said ethylene/acrylic or ethylene/methacrylic acid copolymers ionized by neutralization with metal ions having an ionized valence of one to three inclusive, wherein said random ethylene copolymers contain from about 8 to about 25 percent by weight of acrylic or methacrylic acid copolymerized therein;
    B. about 0.5 to about 3 weight percent, based on the total weight of the blend, of an anti-caking agent selected from the class consisting of saturated fatty acid amides having about 10 to about 22 carbon atoms, monohydroxy substituted saturated fatty acid amides having about 10 to about 22 carbon atoms or alkylene bis-saturated fatty acid amides having the general formula:

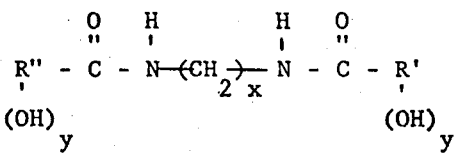

wherein $x$ is an integer having values of 0 to about 12, $R'$ and $R''$ are each aliphatic hydrocarbon residues having about 10 to about 22 carbon atoms and $y$ is an integer having values of 0 to 2 inclusive;
    C. about 0.1 to about 1 percent by weight, based on the total weight of the blend, of a silicone fluid lubricity additive having the formula:

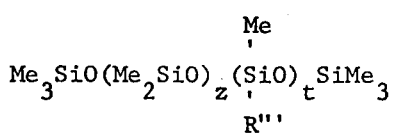

wherein Me is methyl, $z$ is an integer having an average value of about 6 to about 40, $t$ is an integer having an average value of about 3 to about 40, and $R'''$ is a monovalent group selected from the class consisting of —$C_2H_4$-phenyl and alkyls having about 18 to about 22 carbon atoms; and
    D. 0 to about 16 weight percent, based on the total weight of the blend, of an adhesion modifier selected from the class consisting of polyethylene glycols having a molecular weight of about 190-6000, monomethyl ethers of polyethylene glycols having a molecular weight of about 550-5000, and magnesium oxide having a particle size of less than about 0.1 micron and a surface area of greater than about 50 square meters per gram.

2. Article claimed in claim 1 wherein the random ethylene copolymer is an ethylene/acrylic acid copolymer having a melt index of about 5 to about 350 decigrams per minute and contains about 15 to about 20 percent by weight of acrylic acid copolymerized therein.

3. Article claimed in claim 1 wherein the random ethylene copolymer has a melt index of about 5 to about 350 decigrams per minute and contains about 15 to about 20 percent by weight of methacrylic acid copolymerized therein.

4. Article claimed in claim 1 wherein the anti-caking agent is ethylene bis-stearamide.

5. Article claimed in claim 1 wherein the anti-caking agent is ethylene bis(hydroxystearamide).

6. Article claimed in claim 1 wherein the lubricity additive is phenylethylmethyl silicone fluid.

7. Article claimed in claim 1 wherein the adhesion modifier is magnesium oxide.

8. Article claimed in claim 1 wherein the adhesion modifier is a polyethylene glycol having a molecular weight of about 190 to about 6000.

9. Method for coating glass bottles with a continuous clear coating of a random ethylene copolymer which comprises contacting said glass bottles at a temperature of about 200° C. to about 300° C. under powder coating conditions with sufficient powder coating composition to provide a continuous coating on said bottles, said coating composition consisting essentially of:

A. about 80 to about 99 percent by weight based on the total weight of the coating of a random normally solid ethylene copolymer selected from the group consisting of normally solid ethylene/acrylic acid copolymers, ethylene/methacrylic copolymers, and copolymers having from 10 to 90 percent by weight of the carboxylic acid groups of said ethylene/acrylic or ethylene/methacrylic acid copolymers ionized by neutralization with metal ions having an ionized valence of one to three inclusive wherein said copolymers contain from about 8 to about 25 percent by weight of acrylic or methacrylic acid copolymerized therein;

B. about 0.5 to about 3 weight percent based on the total coating composition, of an anti-caking agent selected from the group consisting of saturated fatty acid amides having about 10 to about 22 carbon atoms, monohydroxy substituted saturated fatty acid amides having about 10 to about 22 carbon atoms or alklyene bis-saturated fatty acid amides having the general formula:

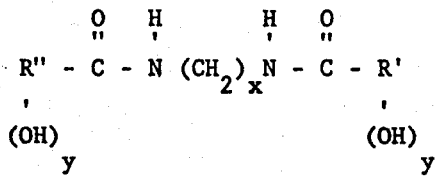

wherein x is an integer having values of 0 to about 12, R' and R" are each aliphatic hydrocarbon residues having about 10 to about 22 carbon atoms and y is an integer having values of 0 to 2 inclusive;

C. about 0.1 to about 1 percent by weight, based on the total weight of the composition, of a silicone fluid lubricity additive having the formula:

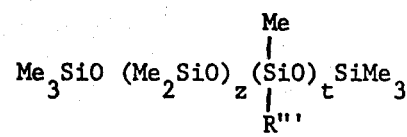

wherein Me is methyl, $z$ is an integer having an average value of about 6 to about 40, $t$ is an integer having an average value of about 3 to about 40, and R''' is a monovalent group selected from the class consisting of —$C_2H_4$-phenyl and alkyls having about 18 to about 22 carbon atoms; and D. 0 to about 16 weight percent, based on the total weight of the composition, of an adhesion modifier selected from the class consisting of polyethylene glycols having a molecular weight of about 190–6000, monomethyl ethers of polyethylene glycols having a molecular weight of about 550–5000, and magnesium oxide having a particle size of less than about 0.1 micron and a surface area of greater than about 50 square meters per gram.

10. Method claimed in claim 9 wherein the random ethylene copolymer is an ethylene/acrylic acid copolymer having a melt index of about 5 to about 350 decigrams per minute and containing from about 15 to about 25 percent acrylic acid copolymerized therein.

11. Method claimed in claim 9 wherein random ethylene copolymer is an ethylene/methacrylic acid copolymer having a melt index of about 5 to about 350 decigrams per minute and contains about 15 to 20 percent by weight of methacrylic acid copolymerized therein.

12. Method claimed in claim 9 wherein the random ethylene copolymer is an ethylene/methacrylic acid copolymer containing about 5 to about 25 percent by weight of methacrylic acid copolymerized therein and having 10 to 90 percent by weight of carboxylic acid groups of said methacrylic acid ionized by neutralization with sodium.

* * * * *